(12) United States Patent
McCue

(10) Patent No.: US 8,006,728 B2
(45) Date of Patent: Aug. 30, 2011

(54) CENTRIFUGAL WHEEL

(76) Inventor: Geoffrey McCue, Lawrence, KS (US)

(*) Notice: Subject to any disclaimer, the term of this patent is extended or adjusted under 35 U.S.C. 154(b) by 217 days.

(21) Appl. No.: 12/390,281

(22) Filed: Feb. 20, 2009

(65) Prior Publication Data

US 2010/0141018 A1 Jun. 10, 2010

Related U.S. Application Data

(60) Provisional application No. 61/144,208, filed on Jan. 13, 2009.

(51) Int. Cl.
*B60B 9/08* (2006.01)
(52) U.S. Cl. .......................................... 152/97; 152/14
(58) Field of Classification Search .................. 301/38.1, 301/39.1, 40.1–40.3, 40.6, 40.4; 152/5, 13–14, 152/17, 19–20, 25, 87–88, 97, 516, 520, 152/6–8, 16, 18, 26, 40, 42, 73, 75
See application file for complete search history.

(56) References Cited

U.S. PATENT DOCUMENTS

| | | | | | |
|---|---|---|---|---|---|
| 1,097,682 | A | * | 5/1914 | Sherrill | 152/277 |
| 1,263,463 | A | * | 4/1918 | Perlman | 152/97 |
| 1,274,190 | A | * | 7/1918 | Nist et al. | 152/14 |
| 1,678,530 | A | * | 7/1928 | Phillips | 152/14 |
| 2,320,331 | A | * | 5/1943 | Jenewein et al. | 152/14 |
| 2,999,524 | A | * | 9/1961 | Marison | 152/6 |
| 3,747,658 | A | * | 7/1973 | Hall | 152/97 |
| 4,906,052 | A | * | 3/1990 | Paganelli | 301/40.1 |
| 6,516,846 | B2 | * | 2/2003 | Chiu | 152/158 |
| 2008/0036285 | A1 | * | 2/2008 | Davis et al. | 301/37.25 |

* cited by examiner

*Primary Examiner* — Jason Bellinger
(74) *Attorney, Agent, or Firm* — Hovey Williams LLP; Adam C. Rehm

(57) ABSTRACT

A centrifugal wheel apparatus for a vehicle having a plurality of pivoting elements attachable to an interior of a vehicle wheel that, when subjected to centripetal force, pivot away from the vehicle wheel and toward a pneumatic tire attached to the vehicle wheel to reshape the pneumatic tire into a dome thereby decreasing surface contact between the vehicle and a surface so that the vehicle may travel with less resistance and increased economy.

20 Claims, 3 Drawing Sheets

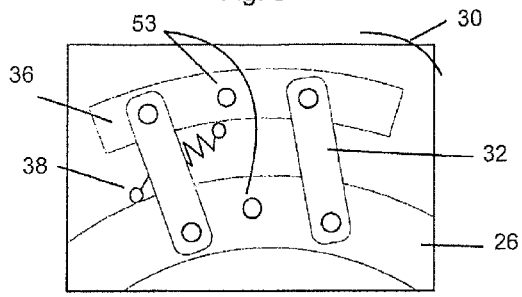
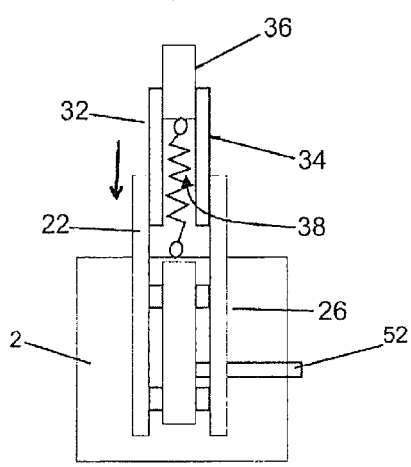
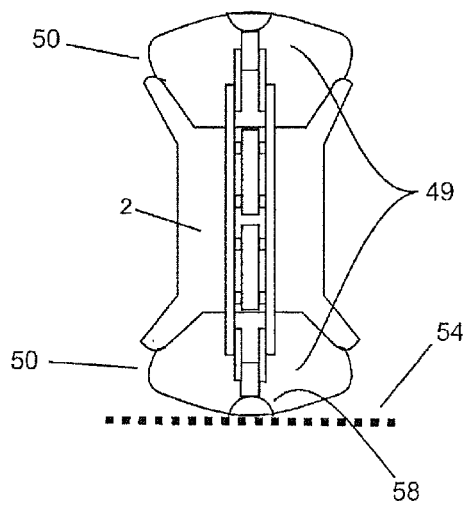
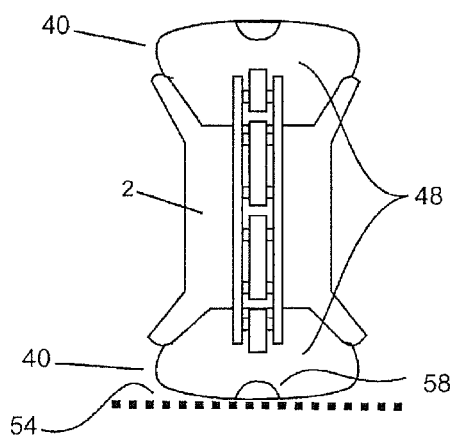
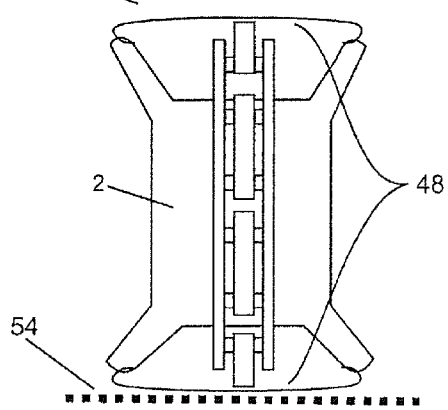

Fig. 8A
Fig. 8B
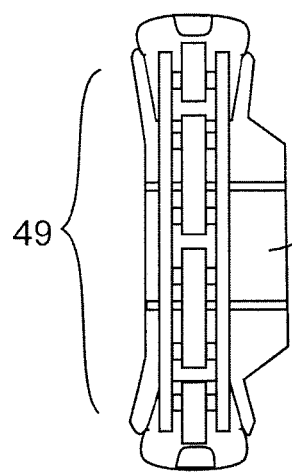
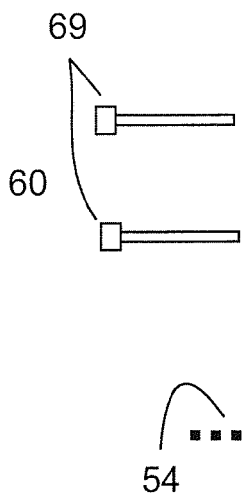
Fig. 9A
Fig 9B
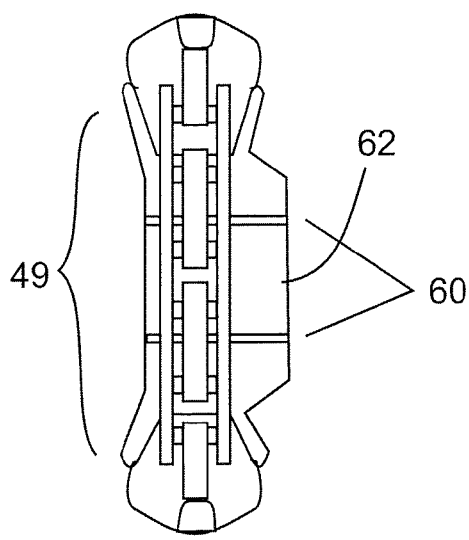
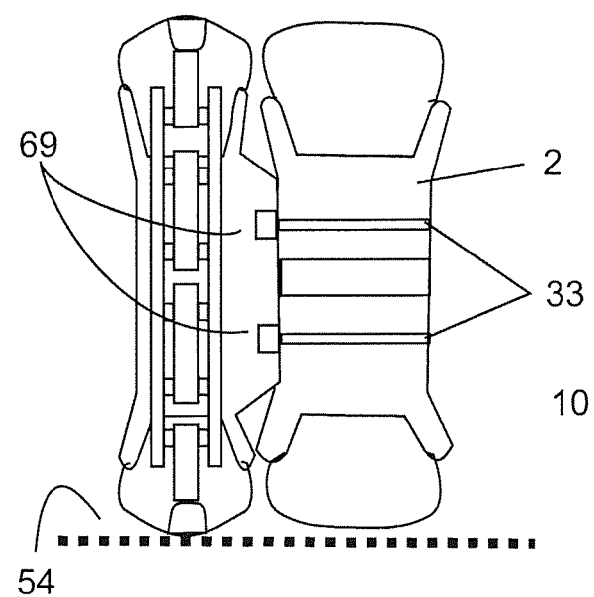

CENTRIFUGAL WHEEL

CROSS-REFERENCE TO RELATED APPLICATION

This application for patent claims the benefit of priority from U.S. Provisional Patent Application Ser. No. 61/144,208 filed Jan. 13, 2009, the disclosure of which is incorporated herein by reference in its entirety.

BACKGROUND OF THE INVENTION

1. Field of the Invention

The present general inventive concept relates to a centrifugal wheel for a vehicle, and in particular, to a vehicle wheel having a plurality of pivoting elements that, when subjected to centripetal force, pivot to reshape a pneumatic tire attached to the wheel.

2. Description of the Related Art

The automotive industry is on a quest to increase fuel economy. Factors contributing to inefficiencies in current automotive technology include weight and friction. Some studies indicate that 85% of the energy created by an engine is used to move a vehicle and not passengers. Friction from the engine itself and rolling resistance or friction created by a tire contacting the road contribute most to these inefficiencies.

Studies done by companies to utilize alternative sources of energy and vehicle design focus on reducing friction. Some experimental vehicles use some form of bicycle-type tire having a narrow profile providing relatively less surface area in which to make contact with the road, as compared with traditional vehicle tires.

While this type of tire works well with small, lightweight cars, it does not lend itself to larger, heavier vehicles especially when these vehicles attempt to accelerate and stop. These deficiencies are due to the fact that, while friction is a disadvantage when related to efficiency, friction is an advantage when related to accelerating and stopping. Moreover, accelerating and stopping maneuvers direct correlate to vehicle weight. Consequently, accelerating and stopping heavier vehicles is better performed using wider tires with more friction while accelerating and stopping lighter vehicles may be adequately performed using narrower tires with less friction.

Another deficiency of a traditional pneumatic tire relates to its dependence on air. If a tire becomes worn, a leak, or is punctured, air is exhausted and the tire becomes flat to the point where metal of the wheel rim comes to ground level. Flat tires are a common place and operators of a vehicle equipped with traditional pneumatic tires will more than likely experience a flat tire at some point.

A tire which has lost sufficient pressure to cause it to become distorted at the bottom will impair the stability of the vehicle and may further damage the tire if it is driven in this condition. The tire should be changed and/or repaired before it becomes completely flat. Continuing to drive the vehicle with an absolutely flat tire will likely damage the tire beyond repair, possibly damage the wheel and/or vehicle, and places the vehicle operator and other vehicles in danger. A flat tire should be considered an emergency situation, requiring immediate attention to rectify the problem.

In relatively less-common situations, the vehicle operator will experience a blowout. Blowouts can be deadly, especially if the blowout occurs when the vehicle is traveling at a high rate of speed. While wheel and tire designs have improved over time with the aim of reducing the likelihood of such, the possibility of experiencing a blowout still exists if a vehicle is equipped with pneumatic tires.

Obviously, when and where a flat tire or blowout occurs are uncontrollable factors. It is possible for such to occur in situations when stopping the vehicle would put the operator in harm's way. Examples of such include driving on bridges without shoulders, on desolate roads, or during extreme weather conditions. In these situations, the operator driver might choose to risk damaging the tire, wheel, and/or vehicle instead of stopping the vehicle to change the flat tire or wait for assistance.

Therefore, it is desirable to provide a new and unique design for an automobile wheel to achieve reduced friction and improved fuel economy while considering the need for acceleration and stopping, to increase safety by preventing blowouts, and to prevent damage to a vehicle if a tire becomes flat.

SUMMARY OF THE INVENTION

The present general inventive concept provides a centrifugal wheel for a vehicle, the wheel having a plurality of pivoting elements that, when subjected to centripetal force, pivot to reshape a pneumatic tire attached to the wheel.

The present general inventive concept further provides a centrifugal wheel having a tire attached thereto that improves fuel economy of a vehicle by reducing friction between the tire and road when the vehicle is traveling at a certain speed.

The present general inventive concept further provides a centrifugal wheel the may be retrofitted onto a vehicle to supplement, aid, coordinate with, and/or exist in addition to an existing traditional wheel and tire.

The present general inventive concept further provides a centrifugal wheel insert the may be retrofitted around an interior surface of an existing wheel.

The present general inventive concept further provides a centrifugal wheel that is easy to manufacture, install onto a vehicle, and use.

The foregoing and/or other aspects of the present general inventive concept may be achieved by providing a vehicle wheel element attachable to a vehicle, the vehicle wheel element including a pivot element mounted to the vehicle wheel element that is moveable from a retracted configuration to an extended configuration.

The vehicle wheel element may also include a deformable element that changes shape depending on whether the pivot element is in the retracted configuration or the extended configuration.

The deformable element may be in a flat shape when the pivot element is in the retracted configuration and the deformable element may be in a domed shape when the pivot element is in the extended configuration.

The pivot element may contact a deformable element during movement between the retracted configuration and the extended configuration and the pivot element may push against the deformable element to reshape the deformable element in the extended configuration.

The pivot element may be mounted closer to an axis of the vehicle wheel relative to the deformable element which may be mounted further from the axis of the vehicle wheel.

The pivot element may be biased to the retracted configuration via a spring element.

The vehicle wheel element may include a biasing element attached to the pivot element to bias the pivot element toward an axis of the vehicle wheel.

A plurality of vehicle wheel elements may be attachable about an outer circumference of a traditional wheel.

The deformable element may be a traditional pneumatic tire.

The deformable element may be a modified tire having a pivot element engagement surface.

The vehicle wheel element may be attachable to a wheel that attachable to a traditional wheel.

The pivot element may automatically move to the extended configuration when the pivot element is subjected to centrifugal force.

The vehicle wheel element may automatically move back and forth from the retracted configuration and the extended configuration depending on a velocity of the vehicle.

The vehicle wheel element may include a locking element to lock the pivot element in the retracted configuration.

Additional aspects and utilities of the present general inventive concept will be set forth in part in the description which follows and, in part, will be obvious from the description, or may be learned by practice of the general inventive concept.

The foregoing and other objects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 3 is a magnified view of a single pivoting element illustrated in FIG. 2B.

FIG. 4 is a magnified view of a single pivoting element illustrated in FIG. 2A.

FIG. 5 is a front elevation view of the present general inventive concept illustrating a plurality of pivoting elements retracted from a tire-engagement element.

FIG. 6 is a side elevation view of the present general inventive concept illustrating a plurality of pivoting elements extended to a tire-engagement element.

FIG. 7 is a front elevation view of the present general inventive concept illustrating a plurality of pivoting elements retracted yet engaged with a flat tire in an emergency scenario.

FIG. 8A is a front elevation view of the present general inventive concept illustrating a plurality of retracted pivoting elements.

FIG. 8B is a front elevation view of the present general inventive concept illustrating a plurality of retracted pivoting elements retrofitted to a traditional wheel.

FIG. 9A is a front elevation view of the present general inventive concept illustrating a plurality of extended pivoting elements.

FIG. 9B is a front elevation view of the present general inventive concept illustrating a plurality of pivoting elements in an extended configuration.

DETAILED DESCRIPTION OF THE PREFERRED EMBODIMENTS

Figure 1:
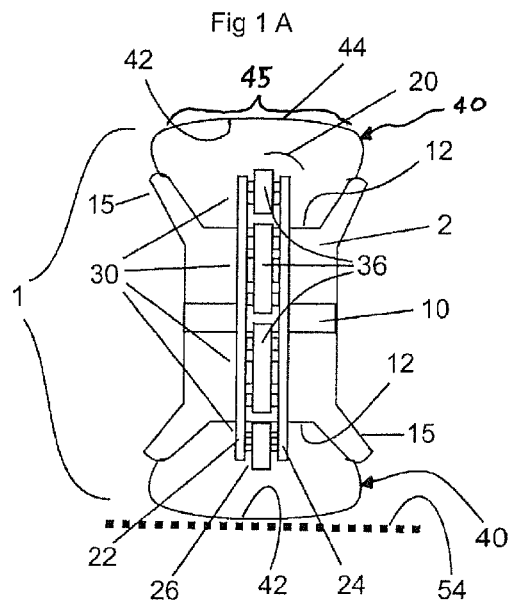
FIG. 1A is a front elevation view of the present general inventive concept illustrating a plurality of pivoting elements in a retracted configuration.
FIG. 1B is a side elevation view of the present general inventive concept illustrating a plurality of pivoting elements in a retracted configuration.
Figure 1:
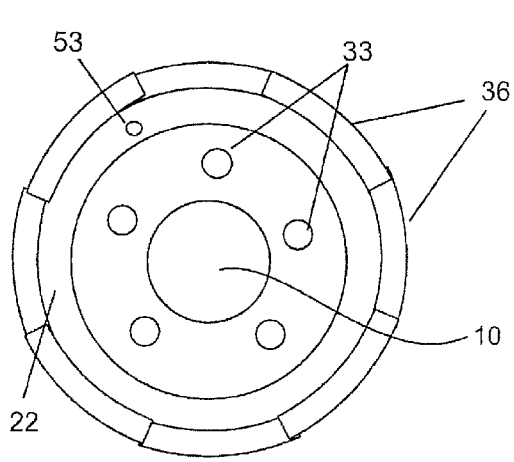

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As illustrated in FIG. 1A, a centrifugal wheel assembly 1 includes a wheel 2 having an axle portion at an axis 10 there of with an outer surface 12 and rim portions 15 extending therefrom. The wheel 2 includes lug holes 33 to accommodate lugs therein for securing the wheel 2 to a vehicle.

Abutting the outer surface 12 is a wheel engagement base assembly 20. In an exemplary embodiment, the wheel engagement base assembly 20 is a single unit that completely surrounds the outer surface 12. Nevertheless, it will be appreciated that the engagement base assembly 20 may be a plurality of units that connect about the outer surface 12, e.g., eight units.

Further, the wheel engagement base assembly 20 has opposing rings 22 and 24 that encircle the outer surface 12. The rings 22 and 24 are spaced from each other to form a channel 26 therebetween.

The wheel engagement base assembly 20 and rings 22 and 24 may be secured to the outer surface 12 via welding or the like.

Attached to the wheel engagement base assembly 20 are a plurality of pivoting elements 30. Each pivoting element 30 has left and right arms 32 and 34 that respectively connect a pivoting tire contact block 36 to the rings 22 and 24.

Figure 2:
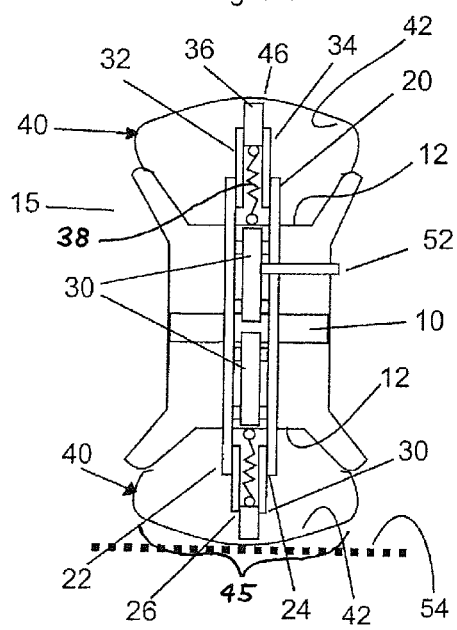
FIG. 2A is a front elevation view of the present general inventive concept illustrating a plurality of pivoting elements in an extended configuration.
FIG. 2B is a side elevation view of the present general inventive concept illustrating a plurality of pivoting elements in an extended configuration.
Figure 2:
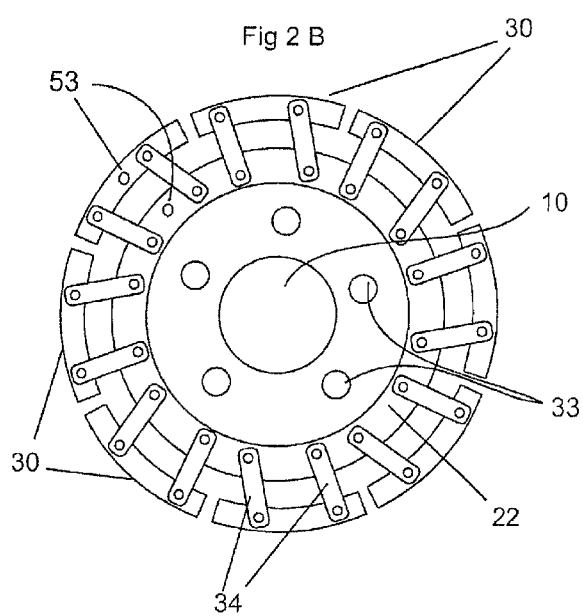

Each tire contact block 36 is pivotal between a first retracted configuration 48 where the tire 40 has a normal flat configuration 44 that is substantially planar, as illustrated in FIG. 1A, and a second expanded or extended configuration 49 where the tire 40 has a domed configuration 46 that is substantially nonplanar relative to the flat configuration 44, as illustrated in FIG. 2A. Each contact block 36 is in the first retracted configuration 48 when the wheel is rotating slowly or has stopped. Each contact block 36 is in the second extended configuration 49 when the wheel is rotating at a predetermined rate.

Each tire contact block 36 is biased toward the outer surface 12 and to the first retracted configuration 48 by a spring 38 attached to the tire contact block 36 and the outer surface 12. It is foreseen that the spring 38 may be connected to an intermediary surface (not illustrated) joining the rings 22 and 24 instead of the outer surface 12.

It is foreseen that the tire contact block 36 may be connected to an intermediary surface (not illustrated) joining the rings 22 and 24 instead of the outer surface 12.

When the wheel 2 rotates as a vehicle the wheel 2 is attached to accelerates, each tire contact block 36 is subjected to increasing centrifugal force. At a predetermined vehicle speed, force exerted on each tire contact block 36 by each spring 38 is overcome, thus causing the tire contact blocks to move away from a center of the wheel 2 to the second extended configuration 49.

When each tire contact block 36 is in the second extended configuration 49, each tire contact block 36 engages an internal surface 42 of tire 40. Each tire contact block 36 has sufficient weight that, along with the centrifugal force exerted on each tire contact block 36, a portion 45 of the tire 40 changes configuration from a normal flat or non-deformed configuration 44 to a domed configuration 46. In other words, each tire contact block 36 biases the portion 45 of the tire 40 outwardly such that the portion 45 of the tire 40 assumes a domed configuration 46. The force exerted on the tire internal surface 42 to induce the domed configuration 46 is aided by the centrifugal force exerted on the tire 40 itself.

In the exemplary embodiment, each tire contact block 36 moves independent from each other. Nevertheless, it is foreseen that each tire contact block 36 may be connected such that each tire contact block 36 moves together from and/or to the first and second configurations in unison.

It is foreseen that the centrifugal wheel assembly 1 may be moved to and/or from the retracted configuration 48 and the extended configuration 49 via pneumatic and/or hydraulic action assistance in addition to or instead of centrifugal force.

It is foreseen that the tire contact block 36 may have a cavity (not illustrated) to conceal the spring 38 therein if the tire contact block 36 is in the retracted configuration 48.

In use, the wheel 2 reduces friction allowing for current automotive technology as well as future design, such as all-electric, to lower friction thereby increasing fuel economy. An additional feature of the wheel 2 serves as a "run flat" design in an emergency as illustrated in FIG. 7.

As pointed out above, tire 40 contact is an important factor for stopping and acceleration. However, as disclosed by the present general inventive concept, a car in motion and traveling at a constant rate or a rate with a small variable is benefited by reduced tire 40 contact, thereby reducing friction and increasing fuel economy.

The present general inventive concept discloses a centrifugal wheel assembly 1 attached to the wheel 2 inside the tire 40. As the wheel 2 rotates, tire contact block 36 starts pushing the tire 40 into a domed position as speed increases as illustrated by FIGS. This "doming" reduces the point of contact of the tire 40 to road 54, thus reducing friction and improving motion.

Expansion is controlled by the dimensions of the pivoting element 30 and can be modified for each and every wheel 2 configuration. When brakes are applied, spring 38 in the pivoting element 30 immediately retract the tire contact block 36 allowing for the necessary contact and friction to stop the vehicle.

One of the features of the present general inventive concept is that while the centrifugal wheel assembly 1 is intended to work with current tire technology such as standard tire 40, a modified tire design would also increase tire life and performance with the use of a specialized tire 50 having a nub element 58 to engage tire contact block 36 as illustrated in FIGS. 5 and 6.

The centrifugal wheel assembly 1 also provides a function in that in the event of a flat tire or blow out, the car is not only supported by rims 15, which could easily cause damage to the rims 15. As illustrated by FIG. 7, in case of a flat or blow out, the centrifugal wheel assembly 1 acts as an inner tire or support to assume some of the vehicle weight and prevents the tires 40 from running on just the rims 15. In addition to deterring rim 15 damage, the vehicle is easier to stop and has a lesser chance of losing control.

It is foreseen that the centrifugal wheel assembly 1 may be locked in either a retracted configuration 48 or an extended configuration 49 for various reasons, e.g., a user may want maximum traction during inclement weather and may want to lock the centrifugal wheel assembly 1 in the retracted configuration 48. As such, the centrifugal wheel assembly 1 may be equipped with a locking pin hole 53 to accommodate a locking pin 52 that when inserted, locks the centrifugal wheel assembly 1 in either the retracted configuration 48 or the extended configuration 49.

It is foreseen that the centrifugal wheel assembly 1 may be locked and/or unlocked via pneumatic and/or hydraulic action assistance.

As depicted in FIG. 2B, the locking pin 52 passes through locking pin hole 53 and extends through the pivoting element 30 and the ring 24.

Because the locking pin 52 may only be inserted by the user in a resting mode when the centrifugal wheel assembly 1 retracted configuration 48, it is foreseen that a mechanic may be required to lock the assembly in the extended configuration 49

Another feature of the centrifugal wheel assembly 1 is that it reduces the necessity of even tire 40 pressure in all four tires 40. Even and proper tire 40 pressure has been proven to increase fuel economy and vehicle stability. Therefore, the centrifugal wheel assembly 1 in all four wheels 2 acts as a method to reduce the "drag" associated with under-inflated tires. This also improves fuel economy.

Yet another feature of the centrifugal wheel assembly 1 is that individual components of the assembly can be changed, updated or modified to meet individual specifications, e.g., wheel diameter, width or composition.

The centrifugal wheel assembly 1 can also be designed and manufactured as a "retrofit" to existing wheels as illustrated in FIGS. 8A-9B.

The centrifugal wheel assembly 1 can be manufactured using steel, aluminum, carbon fiber plastics or any suitable material. The "retrofit" version includes lug bolts 69, which pass through aperture mounting holds 60 to attach the centrifugal wheel assembly 1 and wheel 62 thereof to an existing wheel 68, as depicted in FIG. 8B. It is foreseen that the retrofit wheel 62 may be welded to the existing wheel 68.

This design therefore claims an apparatus and method for improving fuel economy through friction reduction by means of the centrifugal wheel assembly 1 mounted on the wheel, inside the tire 40, to expand under rotation making contact with the tire 40. This contact increase under continued or increased speed lifting or "doming" the tire 40 thereby reducing contact between the tire 40 and the road 54.

This mechanical expansion of the centrifugal wheel assembly 1 is controlled by the length of the arms 32 and 34 attaching the block 36 to the outer surface 12. When expanded to its maximum position, all four tires 40 are equal in diameter, reducing the need for even tire 40 pressure to maintain optimum performance.

The present general inventive concept also claims an apparatus and method for a tire design that increases the amount of tire material in the center of the tire where the centrifugal assembly makes contact, thus reducing wear.

This design also claims a method and apparatus for a "run flat" benefit where as the tire 40 rests on not just the rim 15, but the retracted assembly 30 as well.

Although a few embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A vehicle wheel element attachable to a vehicle, the vehicle wheel element comprising:
    a pivot element mounted to a vehicle wheel that is moveable from a retracted configuration to an extended configuration relative to an outer surface of the vehicle wheel; and
    a deformable element that changes shape depending on whether the pivot element is in the retracted configuration or the extended configuration,
    wherein the deformable element has an internal surface portion that has (i) a non-deformed configuration when the pivot element is in the retracted configuration and (ii) a domed configuration when the pivot element is in the extended configuration.

2. The vehicle wheel element according to claim 1, wherein the pivot element contacts the deformable element during movement between the retracted configuration and the extended configuration and the pivot element pushes against the deformable element to reshape the deformable element in the extended configuration.

3. The vehicle wheel element according to claim 1, wherein the pivot element is mounted closer to an axis of the vehicle wheel relative to the deformable element which is mounted further from the axis of the vehicle wheel.

4. The vehicle wheel element according to claim 1, wherein the pivot element is biased to the retracted configuration via a spring element.

5. The vehicle wheel element according to claim 1, further comprising:
    a biasing element attached to the pivot element to bias the pivot element toward an axis of the vehicle wheel.

6. The vehicle wheel element according to claim 1, wherein the deformable element is a tire.

7. The vehicle wheel element according to claim 1, wherein the vehicle wheel element is operable to be retrofit to the vehicle wheel.

8. The vehicle wheel element according to claim 1, wherein the pivot element automatically moves to the extended configuration when the pivot element is subjected to centrifugal force.

9. The vehicle wheel element according to claim 1, wherein the pivot element automatically moves back and forth from the retracted configuration and the extended configuration depending on a velocity of the vehicle.

10. The vehicle wheel element according to claim 1, further comprising:
    a locking element to lock the pivot element in the retracted configuration.

11. A vehicle wheel element attachable to a vehicle, the vehicle wheel element comprising:
    a deformation element operable to decrease friction of the vehicle, the deformation element mounted to the vehicle and moveable from a first configuration in which the vehicle is subject to a first degree of friction to a second configuration in which the vehicle is subject to a second degree of friction, and
    a deformable element that changes shape depending on whether the deformation element is in the first configuration or the second configuration,
    wherein,
    the second degree of friction is less than the first degree of friction, and
    the deformable element is biased and assumes a domed configuration when the deformation element is in the second configuration.

12. The vehicle wheel element according to claim 11, wherein the deformation element contacts the deformable element during movement between the first configuration and the second configuration and the deformation element pushes against the deformable element to reshape the deformable element in the second configuration.

13. The vehicle wheel element according to claim 11, wherein the deformation element is mounted closer to an axis of a wheel of the vehicle relative to the deformable element which is mounted further from the axis of the wheel of the vehicle.

14. The vehicle wheel element according to claim 11, wherein the deformation element is biased to the first configuration via a spring element.

15. The vehicle wheel element according to claim 11, further comprising:
    a biasing element attached to the deformation element to bias the deformation element toward an axis of a wheel of the vehicle.

16. The vehicle wheel element according to claim 11, wherein the deformable element is a tire.

17. The vehicle wheel element according to claim 11, wherein the vehicle wheel element is operable to be retrofit to a wheel of the vehicle.

18. The vehicle wheel element according to claim 11, wherein the deformation element automatically moves to the second configuration when the deformation element is subjected to centrifugal force.

19. The vehicle wheel element according to claim 11, wherein the deformation element automatically moves back and forth from the first configuration and the second configuration depending on a velocity of the vehicle.

20. The vehicle wheel element according to claim 1, further comprising:
    a locking element to lock the deformation element in the first configuration.

* * * * *